United States Patent
Payne et al.

(10) Patent No.: US 10,202,048 B2
(45) Date of Patent: Feb. 12, 2019

(54) SYSTEMS AND METHODS FOR ADJUSTING OPERATION OF A VEHICLE ACCORDING TO HOV LANE DETECTION IN TRAFFIC

(71) Applicant: Toyota Motor Engineering & Manufacturing North America, Inc., Erlanger, KY (US)

(72) Inventors: Joshua D. Payne, Ann Arbor, MI (US); Shannon Alicia Wrobel, Ann Arbor, MI (US); Heraldo F. Stefanon, Dexter, MI (US); Takanori Aoki, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/635,938

(22) Filed: Jun. 28, 2017

(65) Prior Publication Data
US 2019/0001836 A1    Jan. 3, 2019

(51) Int. Cl.
*G06K 9/00*    (2006.01)
*B60L 11/18*    (2006.01)
(Continued)

(52) U.S. Cl.
CPC .......... *B60L 11/1862* (2013.01); *B60W 20/13* (2016.01); *B60W 40/04* (2013.01); *B60W 40/08* (2013.01); *G06K 9/00838* (2013.01); *B60L 2240/54* (2013.01); *B60L 2240/64* (2013.01); *B60L 2240/68* (2013.01); *B60L 2250/22* (2013.01); *Y10S 903/903* (2013.01)

(58) Field of Classification Search
CPC .............. B60L 11/1862; B60L 2240/68; B60L 2240/64; B60L 2240/54; B60L 2250/22; B60W 20/13; B60W 40/08; B60W 40/04; Y10S 903/903; G01C 21/3658; G06K 9/00838
See application file for complete search history.

(56) References Cited

U.S. PATENT DOCUMENTS 8,306,730 B2    11/2012    Nishibashi et al.
8,942,919 B2    1/2015    Uyeki et al.
(Continued)

FOREIGN PATENT DOCUMENTS

JP    2014-015125    1/2014

*Primary Examiner* — Russell Frejd
(74) *Attorney, Agent, or Firm* — Christopher G. Darrow; Darrow Mustafa PC

(57) ABSTRACT

System, methods, and other embodiments described herein relate to preemptively controlling one or more vehicle systems of a vehicle. In one embodiment, a method includes, in response to (i) detecting that a present traffic level along a route of the vehicle satisfies a congestion threshold and (ii) detecting that a type of roadway on which the vehicle is traveling is a highway, determining whether the vehicle is traveling in a high occupancy vehicle (HOV) lane by identifying whether a number of passengers in the vehicle satisfies an HOV threshold. The method includes adjusting the one or more vehicle systems within the vehicle according to whether the number of passengers satisfies the HOV threshold to cause the vehicle to operate efficiently while traveling along the route with the present traffic level.

20 Claims, 4 Drawing Sheets

(51) Int. Cl.
   *B60W 20/13*   (2016.01)
   *B60W 40/04*   (2006.01)
   *B60W 40/08*   (2012.01)

(56) References Cited

U.S. PATENT DOCUMENTS

| | | | |
|---|---|---|---|
| 9,151,626 B1 | 10/2015 | Kojo | |
| 2004/0158483 A1* | 8/2004 | Lecouturier | G06Q 10/025 |
| | | | 705/6 |
| 2004/0230376 A1 | 11/2004 | Ichikawa et al. | |
| 2005/0274553 A1 | 12/2005 | Salman et al. | |
| 2009/0125160 A1* | 5/2009 | Desai | B60N 2/01 |
| | | | 701/1 |
| 2010/0201505 A1 | 8/2010 | Honary et al. | |
| 2010/0250107 A1* | 9/2010 | Desai | B60N 2/01 |
| | | | 701/118 |
| 2013/0141574 A1* | 6/2013 | Dalal | G06K 9/00362 |
| | | | 348/148 |
| 2013/0147959 A1* | 6/2013 | Wang | G06K 9/00838 |
| | | | 348/149 |
| 2013/0307932 A1* | 11/2013 | Mestha | G01S 17/89 |
| | | | 348/46 |
| 2013/0339072 A1 | 12/2013 | Touge | |
| 2014/0032098 A1* | 1/2014 | Anderson | B60N 2/002 |
| | | | 701/428 |
| 2014/0188376 A1* | 7/2014 | Gordon | G08G 1/09 |
| | | | 701/118 |
| 2014/0313057 A1* | 10/2014 | Kokal | G06K 9/00838 |
| | | | 340/928 |
| 2015/0294168 A1* | 10/2015 | Artan | G06K 9/00838 |
| | | | 382/104 |
| 2015/0324653 A1* | 11/2015 | Xu | G06K 9/00838 |
| | | | 348/148 |
| 2017/0098334 A1* | 4/2017 | Kokal | G07B 15/063 |
| 2017/0124882 A1* | 5/2017 | Wang | G08G 1/167 |
| 2017/0144650 A1* | 5/2017 | Nagamiya | B60W 20/12 |
| 2017/0178416 A1* | 6/2017 | Barreira Avegliano | |
| | | | G07B 15/06 |

* cited by examiner

SYSTEMS AND METHODS FOR ADJUSTING OPERATION OF A VEHICLE ACCORDING TO HOV LANE DETECTION IN TRAFFIC

TECHNICAL FIELD

The subject matter described herein relates in general to systems and methods for adjusting operating parameters of a vehicle according to traffic conditions and, more particularly, to detecting when the vehicle is traveling in a high occupancy vehicle (HOV) lane in traffic in order to adjust aspects of how the vehicle operates to improve efficiency.

BACKGROUND

Motor vehicles are generally tuned or otherwise configured to operate according to received control inputs. A driver/operator provides the control inputs using interface devices, such as a steering wheel, pedals, etc. Accordingly, the vehicle receives the control inputs as the driver reacts to changing conditions around the vehicle. However, because the driver generally operates the vehicle reactively according to changing conditions along a route, the provided inputs are also reactive. Thus, the vehicle brakes, accelerates, steers, shifts, and so on as the inputs are received in a reactive manner that may not be an optimal mode of operation. In other words, because the vehicle controls various systems in response to the driver inputs, the systems are not primed or otherwise optimized to perform a particular task. Instead, the vehicle systems may be tuned to operate in a generalized manner so as to provide an acceptable, but not optimized response according to a wide array of possible inputs.

For example, when a driver operates a vehicle in traffic, the driver may provide control inputs that cyclically accelerate and decelerate the vehicle as the speed of the traffic ebbs and flows. However, because the vehicle is tuned in a generalized manner, a charge level of a battery may not be optimized according to the provided inputs and thus various vehicle systems may inefficiently use available battery charge. As a result, the vehicle may suffer from difficulties such as reduced fuel economy, degraded performance, and other effects when operating in traffic.

SUMMARY

An example of a traffic system that preemptively adjusts operating parameters of a vehicle in anticipation of traffic conditions on different types of roadways is presented herein. In one embodiment, the traffic system monitors different aspects of the roadway to determine when to adjust operating parameters for one or more vehicle systems. For example, the traffic system monitors a present level of traffic along a route and ahead of the vehicle to a defined distance. Accordingly, when the traffic system detects traffic congestion that satisfies a particular density (e.g., stop and go traffic), then the traffic system can further analyze aspects of the roadway and/or vehicle to predict how the vehicle will be controlled while driving in the traffic.

For example, in one aspect, the traffic system determines whether the vehicle is traveling or will be traveling in a high-occupancy vehicle (HOV) lane by determining whether the roadway is a highway and determining whether a number of passengers in the vehicle satisfies requirements for driving in the HOV lane. Consequently, the traffic system can preemptively control one or more vehicle systems to prepare for driving in the present level of traffic on the particular type of roadway. As one example, the traffic system adjusts an extent to which a battery of the vehicle is charged to provide for operating on stored battery power while in the traffic. In this way, the traffic system provides for improved operating efficiency in traffic according to a roadway type and lane type.

In one embodiment, a traffic system for preemptively controlling one or more vehicle systems of a vehicle is disclosed. The system includes one or more processors and a memory that is communicably coupled to the one or more processors. The memory stores a monitoring module that includes instructions that when executed by the one or more processors cause the one or more processors to in response to (i) detecting that a present traffic level along a route of the vehicle satisfies a congestion threshold and (ii) detecting that a type of roadway on which the vehicle is traveling is a highway, determine whether the vehicle is traveling in a high occupancy vehicle (HOV) lane by identifying whether a number of passengers in the vehicle satisfies an HOV threshold. The memory stores a control module including instructions that when executed by the one or more processors cause the one or more processors to adjust operating parameters of the one or more vehicle systems according to whether the number of passengers satisfies the HOV threshold to cause the vehicle to operate efficiently while traveling along the route with the present traffic level.

In one embodiment, a non-transitory computer-readable medium for controlling one or more vehicle systems of a vehicle is disclosed. The computer-readable medium stores instructions that when executed by one or more processors cause the one or more processors to perform the disclosed functions. The instructions include instructions to, in response to (i) detecting that a present traffic level along a route of the vehicle satisfies a congestion threshold and (ii) detecting that a type of roadway on which the vehicle is traveling is a highway, determine whether the vehicle is traveling in a high occupancy vehicle (HOV) lane by identifying whether a number of passengers in the vehicle satisfies an HOV threshold. The instructions include instructions to adjust operating parameters of the one or more vehicle systems according to whether the number of passengers satisfies the HOV threshold to cause the vehicle to operate efficiently while traveling along the route with the present traffic level.

In one embodiment, a method for preemptively controlling one or more vehicle systems of a vehicle. The method includes, in response to (i) detecting that a present traffic level along a route of the vehicle satisfies a congestion threshold and (ii) detecting that a type of roadway on which the vehicle is traveling is a highway, determining whether the vehicle is traveling in a high occupancy vehicle (HOV) lane by identifying whether a number of passengers in the vehicle satisfies an HOV threshold. The method includes adjusting the one or more vehicle systems within the vehicle according to whether the number of passengers satisfies the HOV threshold to cause the vehicle to operate efficiently while traveling along the route with the present traffic level.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with preemptively adjusting the operation of a vehicle according to a roadway type are disclosed. As mentioned previously, different characteristics of how a vehicle operates can be affected according to changes within traffic surrounding the vehicle. That is, because, for example, a hybrid vehicle may operate more efficiently on battery power when driving in traffic, the hybrid vehicle may switch to powering the vehicle from stored energy of a battery upon entering traffic. However, if the battery is not fully charged or otherwise optimized, the vehicle may quickly deplete the available charge. Accordingly, in various embodiments, the hybrid vehicle detects upcoming traffic conditions in order to optimize battery charge or other aspects of operation. However, because the vehicle is not, for example, specifically aware of particular aspects of the roadway (e.g., a presence of HOV lanes) the vehicle may not be optimized for the particular configuration of traffic.

Thus, in one embodiment, the traffic system is implemented in a vehicle to improve operating in traffic conditions. For example, in one embodiment, the traffic system includes aspects that monitor present traffic conditions, roadway features/types, a number of passengers, and so on. Accordingly, the traffic system can analyze the present traffic levels along a route of the vehicle to predict whether traffic congestion is likely to affect the vehicle. Thus, as one example, in an instance where the traffic system identifies that the present traffic level is of a particular density that will affect the travel of the vehicle, the traffic system then analyzes the other noted aspects to assess how the operation of the vehicle will likely be influenced. For example, the traffic system can detect a road type (e.g., a highway with an HOV lane), a number of passengers presently in the vehicle, and so on. From this information, the traffic system determines whether the vehicle is traveling in the HOV lane through the traffic and can adjust one or more vehicle systems to prepare for the traffic (e.g., prioritize charging the battery). In this way, the traffic system facilitates the efficient operation of the vehicle in traffic and according to a lane type.

Figure 1:
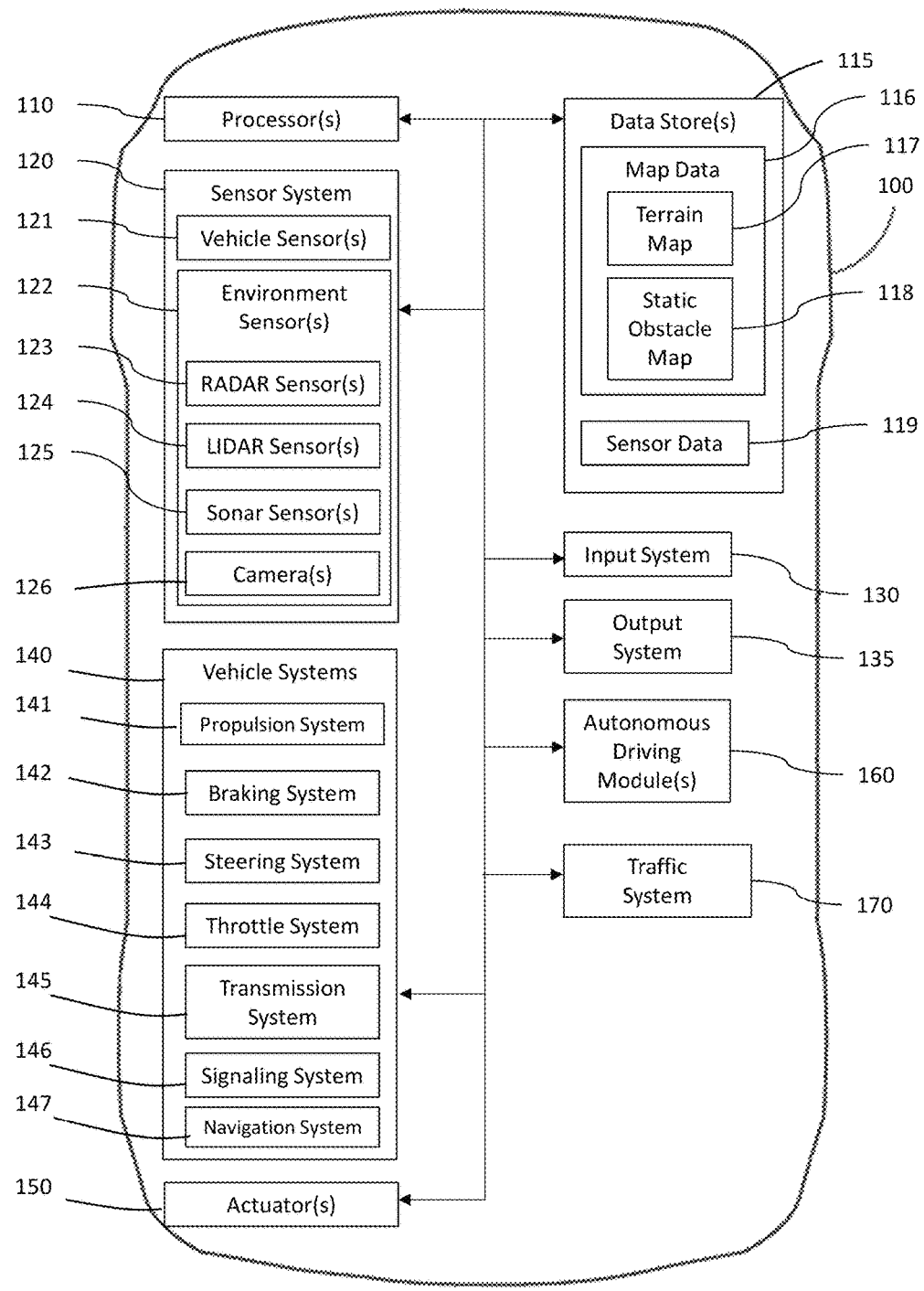
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from detecting when the vehicle 100 is traveling in traffic within an HOV lane and controlling one or more aspects of the vehicle 100 to preemptively adjust one or more systems of the vehicle 100 accordingly.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a traffic system 170 that is implemented to perform methods and other functions as disclosed herein relating to controlling various vehicle systems to improve operation of the vehicle 100 in traffic and according to whether the vehicle 100 is traveling in an HOV lane. The noted functions and methods will become more apparent with a further discussion of the figures.

Figure 2:
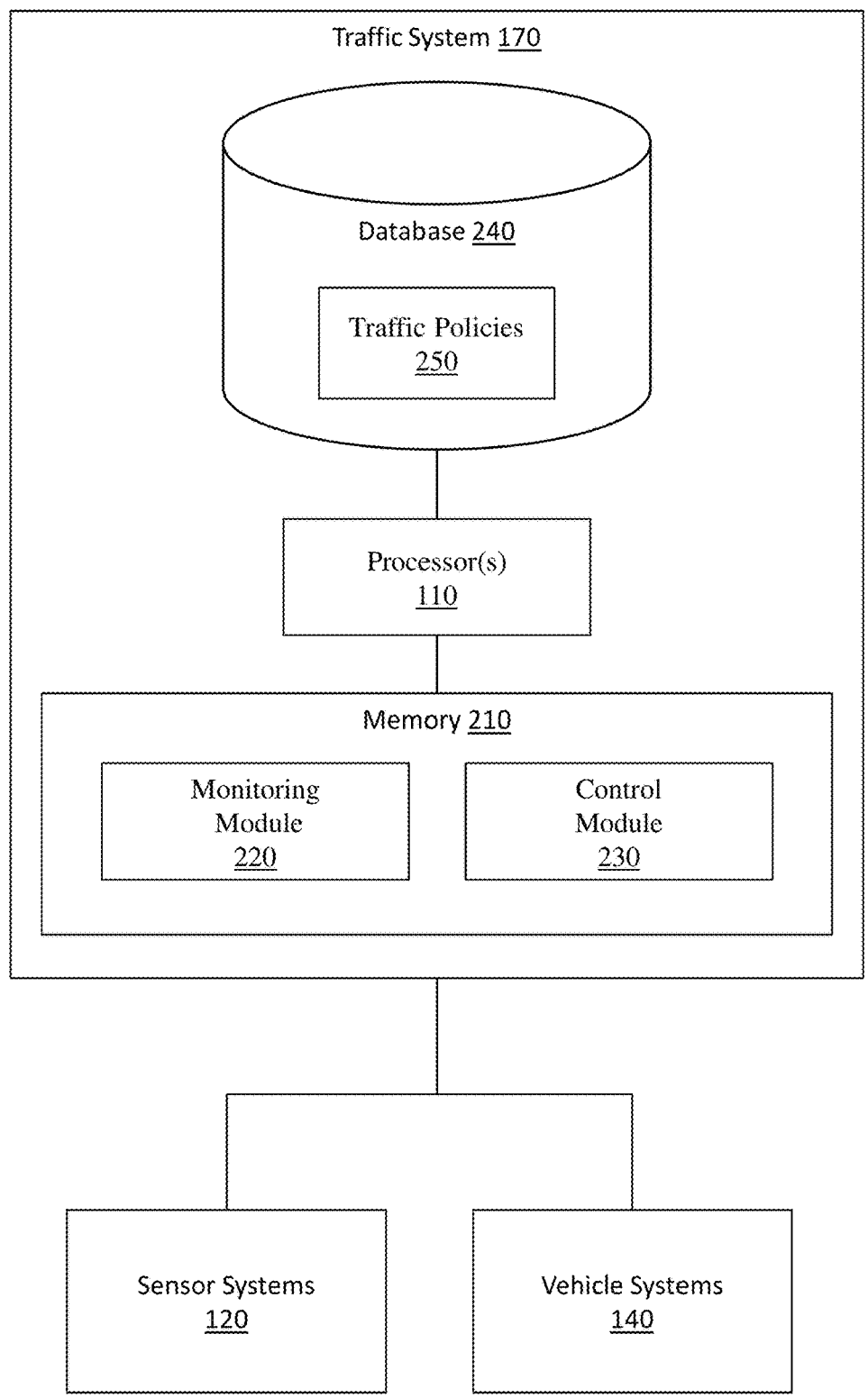
FIG. 2 illustrates one embodiment of an HOV system that is associated with detecting when a vehicle is traveling in an HOV lane in traffic.

With reference to FIG. 2, one embodiment of the traffic system 170 of FIG. 1 is further illustrated. The traffic system 170 is shown as including a processor 110 from the vehicle 100 of FIG. 1. Accordingly, the processor 110 may be a part of the traffic system 170, the traffic system 170 may include a separate processor from the processor 110 of the vehicle 100, or the traffic system 170 may access the processor 110 through a data bus or another communication path. In one embodiment, the traffic system 170 includes a memory 210 that stores a monitoring module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire traffic information and/or sensor data from, for example, one or more sensors of the sensor system 120 and/or the navigation system 147. The traffic information is, in one embodiment, information that identifies characteristics of traffic along a route of the vehicle 100. In general, the traffic information is information about a density of traffic, a speed of traffic, accidents and/or other events that can cause traffic, and so on. Moreover, the monitoring module 220, in one embodiment, monitors traffic up to a defined distance (e.g., 10 km) along a route of the vehicle 100 to determine when and where traffic congestion may be encountered. That is, the monitoring module 220 monitors traffic densities and/or speeds to determine where traffic exists along the route.

In one embodiment, the traffic system 170 includes defined congestion thresholds that indicate a density at which the traffic is considered to affect operation of the vehicle 100. In one embodiment, the congestion threshold can specify a density of the traffic and/or a speed of the traffic that indicates stop and go traffic or traffic that is characterized by a congestion wave. In either case, the monitoring module 220 can either continuously or semi-continuously check traffic along a route of the vehicle 100 to determine if the vehicle 100 is approaching congestion.

It should be noted that, in general, the monitoring module 220 either accesses a planned route of the vehicle 100 through the navigation system 147 or otherwise predicts a route of the vehicle 100 according to learned routes, previous routes, or likely routes of the vehicle 100 as determined from various characteristics (e.g., time of day, day of week/year, etc.). Accordingly, the monitoring module 220 is aware of the route of the vehicle 100 and thus can actively monitor relevant segments of the route for traffic. Furthermore, while the monitoring module 220 is discussed as accessing the navigation system 147 to obtain information relating to traffic ahead of the vehicle 100, in various embodiments, the monitoring module 220 actively scans an environment surrounding the vehicle 100 by controlling one or more sensors (e.g., lidar 124, radar 123, etc.) of the sensor system 120 to determine the presence of traffic and/or to determine particular characteristics of the traffic. Moreover, the monitoring module 220 can query vehicle-to-infrastructure (V2I) elements to determine the presence of traffic and/or other available sources. In either case, the monitoring module 220 functions to detect the presence of traffic and determine whether the density of the traffic satisfies a congestion threshold.

Moreover, once the monitoring module 220 determines that a present traffic level at some point along the route does satisfy the congestion threshold, the monitoring module 220 determines further aspects of the operating environment to assess how the traffic is likely to affect the vehicle 100. Accordingly, in one embodiment, the monitoring module 220, upon detecting traffic congestion along the route, determines a type of the roadway and also how many passengers are presently in the vehicle 100. Determining these further aspects permits the monitoring module 220 to characterize how the traffic is likely to affect the vehicle 100. That is, for example, if the type of roadway is a highway with an HOV lane, and the vehicle 100 presently has two passengers, then the vehicle 100 is likely traveling in the HOV lane. Consequently, the vehicle 100 may not experience the traffic congestion in the same manner as if the vehicle 100 had only one passenger, the driver, and was traveling in a standard lane. This disparity between effects of the traffic arise from the HOV lane moving freely at or near the posted speed limit because of a limited number of vehicles that are permitted to travel in the HOV lane, whereas the standard lanes of the highway may be experiencing stop and go traffic or moving at a speed that is substantially lower the than the speed limit. Accordingly, by determining the particular lane of travel (e.g., whether or not HOV lane), the traffic system 170 facilitates how a control module 230 can prepare the vehicle 100 to operate in the traffic.

For example, in one embodiment, the traffic system 170 includes the control module 230 that generally includes instructions that function to control the processor 110 to control one or more of the vehicle systems 140 according to whether the vehicle 100 is traveling in an HOV lane when the monitoring module 220 determines that traffic is present. In one embodiment, the control module 230 controls various vehicle systems 140 to optimize energy consumption according to a city driving calibration when driving in the HOV lane in traffic. In further embodiments, the control module 230 controls a charging subsystem of the vehicle 100 to increase a charge in the battery in preparation for traffic. Accordingly, the control module 230 can adjust operating parameters of the vehicle 100 in various ways to improve operation according to the particular roadway type, lane of travel, and traffic conditions of which further aspects will be discussed subsequently.

Moreover, in one embodiment, the traffic system 170 includes the database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes traffic policies 250 logged sensor data, logged traffic data, logged vehicle data, one or more computational models, and so on.

In one embodiment, the traffic policies 250 include congestion thresholds, HOV lane requirements (HOV passenger thresholds) for different roadways, indicators for types of roadways (e.g., highways, toll roads, residential streets, etc.), indicators of which roadways have HOV lanes, control profiles for how operating parameters of different vehicle systems 140 are to be adjusted depending on traffic, present route data, historic route data, and so on. In general, the database 240 includes information that is useful to the modules 220 and 230 when performing the stated functions. As an additional aspect, the database 240 may be provided as a cloud storage and is accessed by the traffic system 170 via a communications link (e.g., cellular communications channel).

Figure 3:
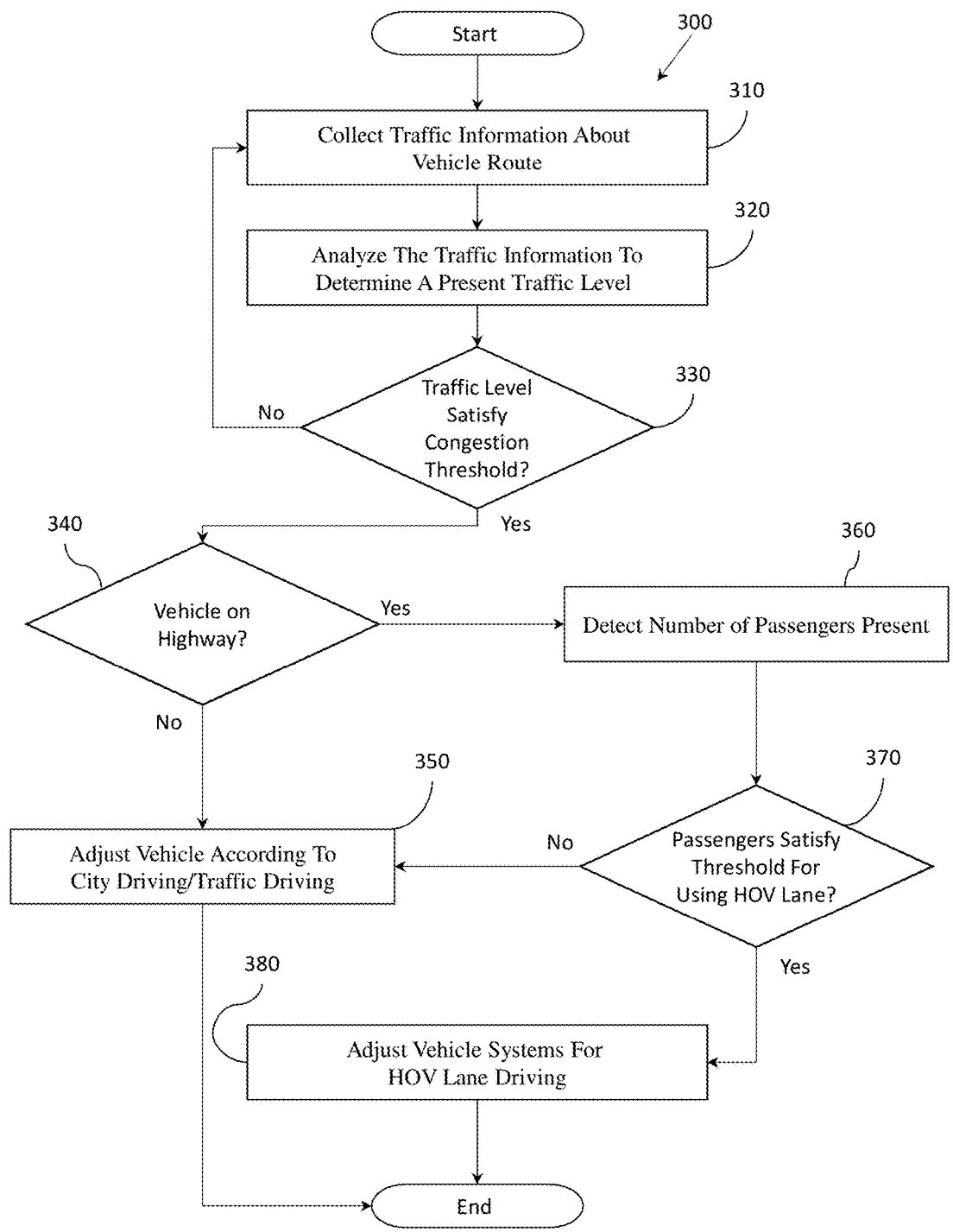
FIG. 3 is a flow diagram illustrating one embodiment of a method that is associated with detecting traffic levels and whether the vehicle is traveling in an HOV lane in order to adjust vehicle systems.

Additional aspects of controlling the vehicle systems 140 according to a detected level of traffic and a type of lane within a roadway will be discussed in relation to FIG. 3. FIG. 3 illustrates a flowchart of a method 300 that is associated with preemptively controlling vehicle systems according to detected traffic levels. Method 300 will be discussed from the perspective of the traffic system 170 of FIGS. 1 and 2. While method 300 is discussed in combination with the traffic system 170, it should be appreciated that the method 300 is not limited to being implemented within the traffic system 170, but is instead one example of a system that may implement the method 300.

At 310, the monitoring module 220 collects information about traffic conditions along a route of the vehicle 100. As previously noted, the monitoring module 220 is generally aware of the route of the vehicle 100 as determined from, for example, electronically accessing a route in the navigation system 147 or by predicting a route according to learned behaviors of the driver/vehicle 100. In either case, the monitoring module 220 electronically collects information about a present level of traffic along the route. In one embodiment, the monitoring module 220 electronically queries the navigation system 147 for traffic information, gathers the traffic information through vehicle-to-vehicle (V2V)

communications, Vehicle-to-infrastructure (V2I), through a communication link with a communication network or by other suitable means.

Moreover, it should be appreciated that traffic information generally refers to a density of vehicles in relation to a capacity of a particular roadway and/or a speed of vehicles in relation to a posted speed limit. In this way, the monitoring module 220 can compare the traffic information with specified metrics of a congestion threshold to determine the presence of traffic. In further embodiments, the monitoring module 220 can also collect information about additional aspects of the traffic from environmental sensors (e.g., LIDAR 124, RADAR 123, etc.) of the vehicle 100 in order to further inform and/or confirm information about traffic obtained through other means.

At 320, the monitoring module 220 determines the present traffic level by analyzing the traffic information collected at 310. In one embodiment, the monitoring module 220 classifies the traffic information according to the traffic policies 250. For example, the monitoring module 220 can specify the present level of traffic in different formats. In one embodiment, the monitoring module 220 can use a scale that includes different classifications for different densities of traffic. By way of example, the scale may include free flowing traffic, light traffic (e.g., significant presence of vehicles but not presently impeding the flow of vehicles), and congestion (e.g., impeding the flow of vehicles or otherwise influencing a speed of traffic). In general, the traffic policies 250 can specify the criteria for classifying the traffic according to the separate categories. By way of example, the policies 250 can define separate classifications (e.g., green, yellow, red) for different degrees or densities of traffic that correlate with how the traffic is presently flowing.

Thus, the monitoring module 220 analyzes the traffic information and assigns a classification, such as yellow, to the present traffic level to indicate to the system 170 a degree or extent of the present traffic. In further embodiments, the monitoring module 220 may specify a likelihood of traffic that impedes the vehicle 100 from traveling at the posted speed limit or according to another indicator of the presence of traffic that is derived from the traffic information.

At 330, the monitoring module 220 determines whether the present traffic level satisfies the congestion threshold. In one embodiment, the congestion threshold specifies a density for the traffic that is considered to impede driving of the vehicle 100. Thus, the congestion threshold is indicative of an amount of traffic that can cause the vehicle to experience inefficiencies in operation without preparing one or more system of the vehicle 100 by adjusting operation parameters. Thus, the congestion threshold indicates a critical mass of traffic at which operation of the vehicle 100 is affected.

In either case, the monitoring module 220 checks whether the present traffic level satisfies the congestion threshold by comparing the present traffic level with the congestion threshold. In one embodiment, the monitoring module determines that the present traffic level satisfies the congestion threshold if the present traffic level meets or exceeds the congestion threshold. If the congestion threshold is not satisfied, then the monitoring module 220 continues to monitor the traffic at blocks 310-330. However, if the congestion threshold is satisfied, then the monitoring module 220 continues with further analysis as discussed at blocks 340.

At 340, the monitoring module 220 determines whether the vehicle 100 is traveling on a highway. That is, the monitoring module 220 determines whether a type of roadway on which the vehicle is traveling is a highway or, more particularly, whether a segment of roadway on which the identified traffic is located is a highway. In further aspects, the monitoring module 220 also determines whether the roadway includes an HOV lane. Thus, the monitoring module 220 can electronically query a navigation system 147 of the vehicle 100 or the database 240 to request an identifier of the type of the roadway. That is, the navigation system 147 and/or the database 240 may include a listing of identifiers for roadways of the route including indicators of road capacity and road type. The type of the roadway can indicate whether the roadway includes an HOV lane, a type of HOV lane, passenger requirements (i.e., HOV threshold) for traveling in the HOV lane, and so on. In either case, the monitoring module 220 obtains the indicator in, for example, a response to the query.

If the monitoring module 220 determines that the type of the roadway is not a highway, then the control module 230 proceeds to adjust one or more of the vehicle system 140 as discussed at block 350. At 350, the control module 230 adjusts one or more vehicle systems 140 within the vehicle 100 according to a city calibration mode. That is, the determination by the monitoring module 220 that the type of the roadway is not a highway, causes the control module 230 to default to configuring operating parameters of the vehicle 100 for city driving. Thus, the control module 230, in one embodiment, adjusts operating parameters of the vehicle 100 for frequent accelerating and braking as is often experienced in urban driving. Accordingly, the control module 230 can prioritize regenerative braking, and other energy saving/recovery methods to extend vehicle battery life while driving in traffic within an urban environment.

If the monitoring module 220 determines that the type of roadway is a highway, then at 360, the monitoring module 220 identifies whether a number of passengers in the vehicle 100 satisfies an HOV threshold. That is, in one embodiment, the monitoring module 220 controls one or more sensors of the vehicle 100 to determine how many passengers are present within the vehicle 100. In one embodiment, the monitoring module 220 controls seat pressure sensors to identify whether a passenger is seated in a particular location, controls a seatbelt sensor (e.g., locking mechanism sensor), controls one or more cameras within an interior of the vehicle 100 to identify a presence of passengers, visually or audibly prompts a driver/operator to indicate a number of passengers, and so on.

In either case, the monitoring module 220 detects how many passengers are present in the vehicle at 360 in order to determine, at block 370, whether the number of passengers satisfies an HOV threshold. The HOV threshold indicates a number of passengers that are to be present in the vehicle 100 in order for the vehicle 100 to use the HOV lane. As previously indicated, the monitoring module 220 acquires the HOV threshold through a lookup in the database 240, via data from the navigation system 147, through active electronic communications with a toll booth or other communications source that provide the HOV threshold, or through another suitable source. In either case, at 370, the monitoring module compares the detected number of passengers in the vehicle 100 with the HOV threshold to determine whether the requirement is satisfied.

If the monitoring module 220 determines that there are not a sufficient number of passengers, at 370, then the control module 230 adjusts vehicle systems 140 as previously mentioned at 350. Alternatively, the control module 230 can include programming as specified by the traffic policies 250 to adjust the operation of the vehicle 100 for highway operation in traffic by, for example, prioritizing energy saving settings with the vehicle 100 so that fuel economy does not suffer while operating in traffic and/or by pre-charging a state of charge (SOC) of the battery to provide for operating the vehicle on the stored charge upon arriving at the detected traffic.

By contrast, at 370, if the monitoring module 220 determines the vehicle 100 does include the specified number of passengers to satisfy the HOV threshold, then the control module 230, at 380, adjusts the operation of the vehicle 100 for traveling in the HOV lane while in the detected traffic. Because the detected traffic is presumed to have a lessened effect on the vehicle 100 when traveling in the HOV lane, the control module 230 adjusts the vehicle systems 140 according to operating parameters specified by an HOV lane calibration. That is, the control module 230 adjusts the vehicle 100 to cause efficient operation while traveling along the route with the present traffic level. As one example, the control module 230 can adjust a boundary level for a state of charge (SOC) of a vehicle battery to permit the vehicle 100 to pre-charge the battery prior reaching the traffic. Thus, if delays are experienced from the traffic, the vehicle 100 can rely on electric energy stored in preparation for the traffic instead of switching to fuel.

It should be noted that, in one embodiment, the vehicle 100 is a hybrid electric vehicle and in various embodiments is a power split hybrid. Thus, the vehicle 100 can operate from the electric charge stored in the batteries and can also operate from a combustion motor. Moreover, the vehicle 100 can charge the battery using the combustion motor and/or conserve charge prior to reaching the traffic to optimize operation of the vehicle 100 in the traffic while traveling in an HOV lane. In this way, the traffic system 170 can account for particularities of operating the vehicle 100 in traffic on different types of roadways including roadways with HOV lanes when, for example, the resolution of the navigation system 147 (i.e., associated GPS location) is not sufficient to resolve whether the vehicle 100 is located within the HOV lane.

As an additional matter, it should be noted that the disclosed functionality of monitoring at 310-330, determining the roadway type at 340, 360-370, and adjusting at 350 and 380 generally occur in parallel to continuously determine the present traffic level along approaching segments of the route and adjust the operating parameters of the vehicle systems 140 accordingly. Thus, the described method 300, in one embodiment, includes multiple parallel processes that function to monitor the traffic levels, determine the presence of HOV lanes, and adjust operating parameters of the vehicle 100.

Figure 4:
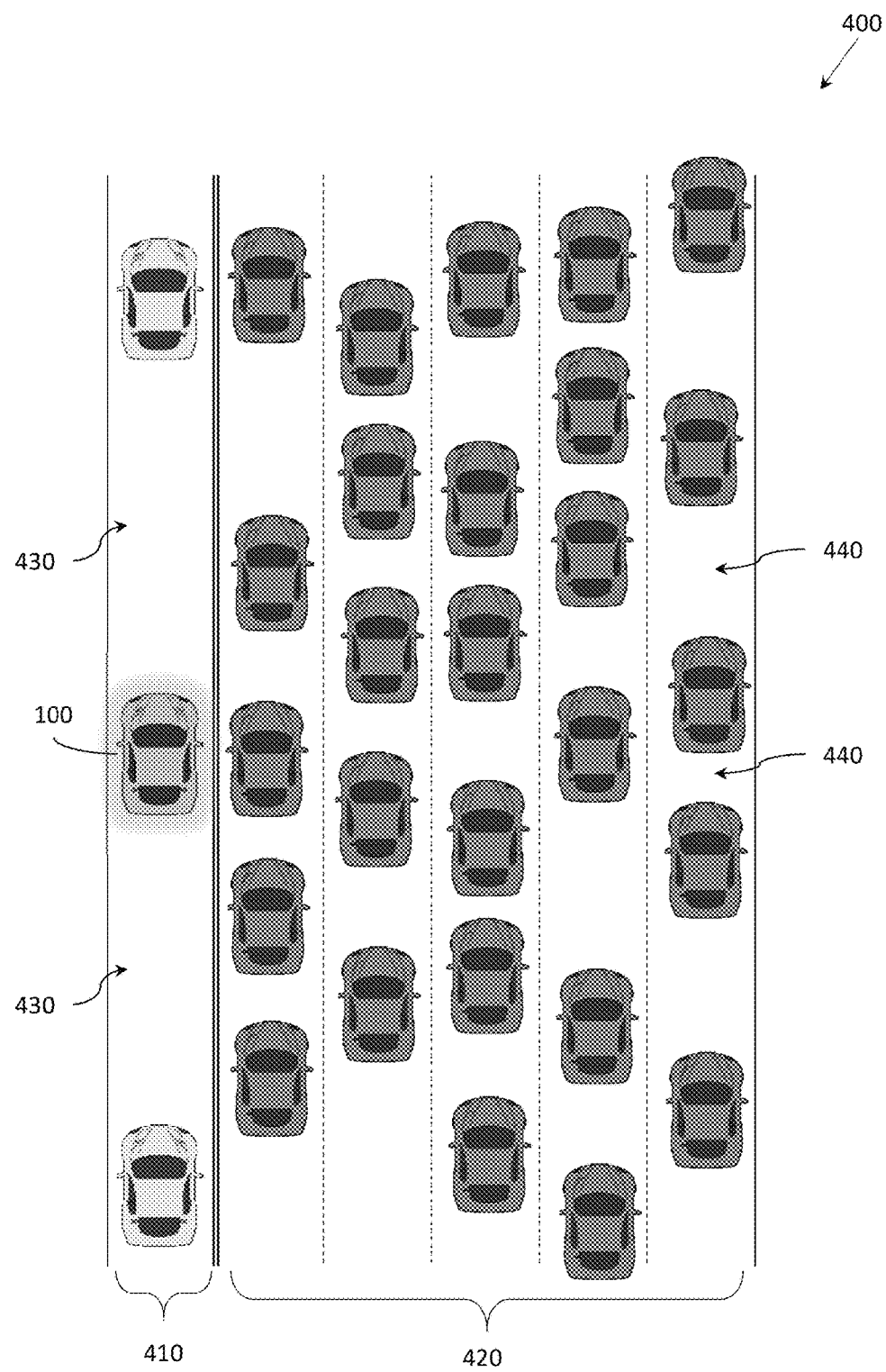
FIG. 4 is a diagram illustrating operation of a vehicle within an HOV lane.

As a further example of how the traffic system 170 functions, consider FIG. 4. FIG. 4 illustrates a segment of highway 400 that includes an HOV lane 410 and standard lanes 420. As illustrated, the highway 400 includes five standard lanes 420 and a single HOV lane 410 within which the vehicle 100 is traveling. However, because the navigation system 147 cannot precisely locate within which lane of the highway 400 the vehicle 100 is traveling, the traffic system 170 undertakes the analysis set forth in method 300. That is, for example, when reviewing the general patterns of the traffic on the highway 400, a density of vehicles in the standard lanes 420 is relatively higher in comparison to the vehicles in the HOV lane 410. This is apparent when considering the gaps 430 versus the gaps 440 between vehicles in the respective lanes. Thus, while the traffic system 170 may detect traffic as a general condition on the roadway 400, this traffic is generally indicative of the density of vehicles and/or the speed of vehicles within the standard traffic lanes 420 and not necessarily within the HOV lane 410.

Consequently, to account for the possibility of traveling in an HOV lane and thus experiencing different traffic patterns than if traveling in the standard lanes 420, the traffic system 170 actively monitors for traffic conditions and whether a particular segment of highway includes an HOV lane. From this information, the traffic system 170 can determine whether a number of passengers in the vehicle 100 satisfy an HOV threshold. If the number of passengers satisfies the HOV threshold, the traffic system 170, in one embodiment, assumes that the vehicle 100 is traveling in the HOV lane 410. Accordingly, the traffic system 170 adjusts the vehicle systems 140 according to a predicted traffic level for the HOV lane and not the traffic level of the standard lanes 420 as may otherwise be the determination. Thus, in one embodiment, the traffic system 170 can prioritize charging batteries of the vehicle 100 when traveling in the HOV lane since charging is more efficient at higher speeds as opposed to prioritizing energy conservation if driving in stop and go traffic of the standard lanes 420. In this way, the traffic system 170 can provide a more refined/granular approach to adjusting operating parameters of the vehicle 100 according to traffic conditions and a type of roadway on which the vehicle 100 is traveling.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, a geolocation system, and so on.

The processor(s) 110, the traffic system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the traffic system 170, and/or the autonomous driving module(s) 160 may control some or all of these vehicle systems 140 and, thus, may be partially or fully autonomous.

The processor(s) 110, the traffic system 170, and/or the autonomous driving module(s) 160 can be operably connected to communicate with the various vehicle systems 140 and/or individual components thereof. For example, returning to FIG. 1, the processor(s) 110, the traffic system 170, and/or the autonomous driving module(s) 160 can be in communication to send and/or receive information from the various vehicle systems 140 to control the movement, speed, maneuvering, heading, direction, etc. of the vehicle 100. The processor(s) 110, the traffic system 170, and/or the autonomous driving module(s) 160 may control some or all of these vehicle systems 140.

The processor(s) 110, the traffic system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the traffic system 170, and/or the autonomous driving module(s) 160 can control the direction and/or speed of the vehicle 100. The processor(s) 110, the traffic system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the traffic system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A traffic system for preemptively controlling one or more vehicle systems of a vehicle, comprising:
    one or more processors;
    a memory communicably coupled to the one or more processors and storing:
    a monitoring module including instructions that when executed by the one or more processors cause the one or more processors to, in response to (i) detecting that a present traffic level along a route of the vehicle satisfies a congestion threshold and (ii) detecting that a type of roadway on which the vehicle is traveling is a highway, determine whether the vehicle is traveling in a high occupancy vehicle (HOV) lane by identifying whether a number of passengers in the vehicle satisfies an HOV threshold to infer that the vehicle is traveling in the HOV lane without directly detecting in which lane the vehicle is traveling; and
    a control module including instructions that when executed by the one or more processors cause the one or more processors to adjust operating parameters of the one or more vehicle systems according to whether the number of passengers satisfies the HOV threshold to cause the vehicle to operate efficiently while traveling along the route with the present traffic level.

2. The traffic system of claim 1, wherein the monitoring module further includes instructions to detect the type of the roadway by electronically querying a navigation system of the vehicle to request an identifier of the type of the roadway and, in response to the querying, receive an electronic indicator that specifies the type of the roadway and whether the highway includes the HOV lane.

3. The traffic system of claim 2, wherein the indicator of the type of the roadway further specifies the HOV threshold, and wherein the HOV threshold specifies how many passengers are to be within the vehicle for the vehicle to qualify for driving in the HOV lane.

4. The traffic system of claim 1, wherein the monitoring module further includes instructions to detect that the present traffic level satisfies the congestion threshold by controlling one or more sensors of the vehicle to determine whether traffic along the route and ahead of the vehicle up to a specified range is of at least a density indicated by the congestion threshold, and wherein the congestion threshold specifies a density for the traffic that impedes driving at posted speed limits.

5. The traffic system of claim 1, wherein the monitoring module further includes instructions to identify whether the number of passengers in the vehicle satisfies the HOV threshold by controlling one or more sensors of the vehicle to determine the number of the passengers and whether the number of the passengers exceeds the HOV threshold.

6. The traffic system of claim 1, wherein the control module further includes instructions to adjust the one or more vehicle systems by adjusting a boundary level for a state of charge (SOC) of a vehicle battery within the vehicle to pre-charge the battery to the boundary level to account for traffic flow while traveling in the present traffic level.

7. The traffic system of claim 1, wherein the control module further includes instructions to adjust the one or more vehicle systems by controlling the vehicle to pre-charge a vehicle battery.

8. The traffic system of claim 1, wherein the vehicle is a hybrid electric vehicle.

9. A non-transitory computer-readable medium for controlling one or more vehicle systems of a vehicle and storing instructions that when executed by one or more processors cause the one or more processors to:
    in response to (i) detecting that a present traffic level along a route of the vehicle satisfies a congestion threshold and (ii) detecting that a type of roadway on which the vehicle is traveling is a highway, determine whether the vehicle is traveling in a high occupancy vehicle (HOV) lane by identifying whether a number of passengers in the vehicle satisfies an HOV threshold to infer that the vehicle is traveling in the HOV lane without directly detecting in which lane the vehicle is traveling; and
    adjust operating parameters of the one or more vehicle systems according to whether the number of passengers satisfies the HOV threshold to cause the vehicle to operate efficiently while traveling along the route with the present traffic level.

10. The non-transitory computer-readable medium of claim 9, wherein the instructions to detect the type of the roadway include instructions to electronically query a navigation system of the vehicle to request an identifier of the type of the roadway and, in response to the querying, receive an electronic indicator that specifies the type of the roadway and whether the highway includes the HOV lane.

11. The non-transitory computer-readable medium of claim 10, wherein the indicator of the type of the roadway further specifies the HOV threshold, and wherein the HOV threshold specifies how many passengers are to be within the vehicle for the vehicle to qualify for driving in the HOV lane.

12. The non-transitory computer-readable medium of claim 9, wherein the instructions to detect that the present traffic level satisfies the congestion threshold include instructions to control one or more sensors of the vehicle to determine whether traffic along the route and ahead of the vehicle up to a specified range is of at least a density indicated by the congestion threshold, and wherein the congestion threshold specifies a density for the traffic that impedes driving at posted speed limits.

13. The non-transitory computer-readable medium of claim 9, wherein the instructions to identify whether the number of passengers in the vehicle satisfies the HOV threshold include instructions to control one or more sensors of the vehicle to determine the number of the passengers and whether the number of the passengers exceeds the HOV threshold.

14. A method for preemptively controlling one or more vehicle systems of a vehicle, comprising:
    in response to (i) detecting that a present traffic level along a route of the vehicle satisfies a congestion threshold and (ii) detecting that a type of roadway on which the vehicle is traveling is a highway, determining whether the vehicle is traveling in a high occupancy vehicle (HOV) lane by identifying whether a number of passengers in the vehicle satisfies an HOV threshold to infer that the vehicle is traveling in the HOV lane without directly detecting in which lane the vehicle is traveling; and adjusting operating parameters of the one or more vehicle systems within the vehicle according to whether the number of passengers satisfies the HOV threshold to cause the vehicle to operate efficiently while traveling along the route with the present traffic level.

15. The method of claim 14, wherein detecting that the type of the roadway includes electronically querying a navigation system of the vehicle to request an identifier of the type of the roadway and, in response to the querying, receiving an electronic indicator that specifies the type of the roadway and whether the highway includes the HOV lane.

16. The method of claim 15, wherein the indicator of the type of the roadway further specifies the HOV threshold, and wherein the HOV threshold specifies how many passengers are to be within the vehicle for the vehicle to qualify for driving in the HOV lane.

17. The method of claim 14, wherein detecting that the present traffic level satisfies the congestion threshold includes controlling one or more sensors of the vehicle to determine whether traffic along the route and ahead of the vehicle up to a specified range is of a density indicated by the congestion threshold, wherein the congestion threshold specifies a density for the traffic that impedes driving at posted speed limits.

18. The method of claim 14, wherein identifying whether the number of passengers in the vehicle satisfies the HOV threshold includes controlling one or more sensors of the vehicle to determine the number of the passengers and whether the number of the passengers exceeds the HOV threshold.

19. The method of claim 14, wherein adjusting the one or more vehicle systems includes adjusting a boundary level for a state of charge (SOC) of a vehicle battery within the vehicle to account for improved traffic flow of the HOV lane in comparison to further lanes of the highway.

20. The method of claim 14, wherein adjusting the one or more vehicle systems includes controlling the vehicle to pre-charge a vehicle battery.

* * * * *